July 19, 1966  E. W. FARMER  3,262,090
SONOBUOY DEPTH SELECTION MECHANISM
Filed March 26, 1964  2 Sheets-Sheet 1

INVENTOR
Everett W. Farmer

July 19, 1966     E. W. FARMER     3,262,090
SONOBUOY DEPTH SELECTION MECHANISM
Filed March 26, 1964     2 Sheets-Sheet 2
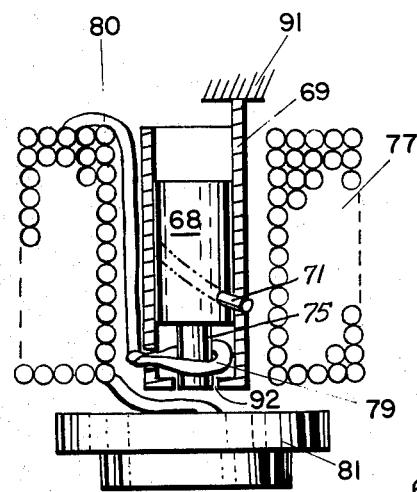
FIG. 2.
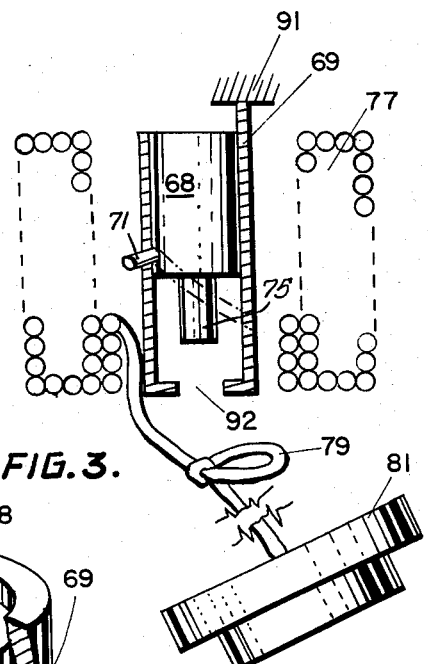
FIG. 3.
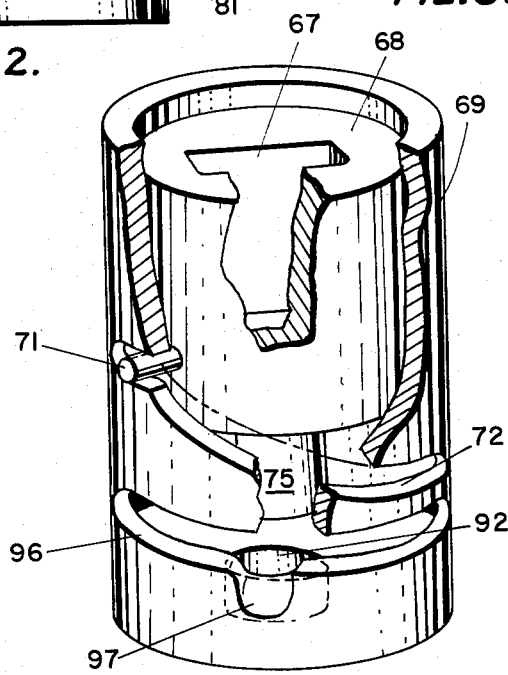
FIG. 4
INVENTOR
Everett W. Farmer

United States Patent Office 3,262,090
Patented July 19, 1966

3,262,090
SONOBUOY DEPTH SELECTION MECHANISM
Everett W. Farmer, Reeds Ferry, N.H., assignor to Sanders Associates, Inc., Nashua, N.H., a corporation of Delaware
Filed Mar. 26, 1964, Ser. No. 354,945
19 Claims. (Cl. 340—2)

This invention relates to a variable depth selection device for underwater suspension of a component from a water supported apparatus.

More specifically, this invention relates to an air-launched sonobuoy having a floatable housing which has contained therein an electronic apparatus and a transducer which are to be lowered to a predetermined ocean depth upon water impact of the sonobuoy. The transducer, which can be for example a hydrophone or hydrophones, as the case may be, is a sensitive underwater listening device which relays to the sonobuoy's electronic apparatus pertinent information concerning the origin of a sound producing source. Normal usage of this type of sonobuoy is for the detection of submarines, oceanographic surveys, seismic studies in the search for mineral deposits and marine life studies. Of increased importance in recent times has been the need to precisely suspend the hydrophones at predetermined depths, the depth selection being a requisite for accurate location of submerged noise producing sources. Heretofore, little has been done to provide a sonobuoy with the capacity to satisfy the above depth selection function.

The prior art, while making in some instances a provision for depth selection, has contained a basic deficiency in that the depth selector is conventionally located within the environs of the sonobuoy's internal mechanisms and therefore not readily accessible for setting or altering the depth selection setting. This above noted arrangement required the complete dismantling of the sonobuoy to effect a change. This in itself is time consuming and inconvenient. This situation is even further aggravated by the fact that the sonobuoys are to be launched from high-speed aircrafts, which aircrafts have a minimum of free space in which to store the sonobuoys and to make the depth selection adjustment which selection calls for a complete dismantling of the prior art sonobuoys in cramped quarters in extremely unfavorable conditions. It is therefore seen that the versatility of the prior art sonobuoys in these respects is severely limited.

The invention to be described hereafter completely overcomes all of these deficiencies in that the sonobuoy has a most compact sphere shaped configuration which lends itself to storage in a minimum of space. Precise depth selection settings may be accomplished externally of the sonobuoy's housing without the use of any tools and without the need to dismantle the sonobuoy.

It is therefore an object of this invention to provide a sonobuoy with a variable depth selection capacity which is externally adjustable.

It is a further object of this invention to provide a highly compact sphere shaped, air-launched sonobuoy having precise depth selection capabilities.

Another object of this invention is the provision of an in-water stabilized sonobuoy whose water stabilizer maintains a dual function of stabilizing the direction of underwater direction while simultaneously providing a structure that has the added utility of a depth selection setting control.

Yet another object of this invention is the provision of an automatic ejector to dispose of the flight stabilizer and thereby provide for efficient antenna release of the antenna carried by the sonobuoy.

For a better understanding of the present invention together with other and further objects thereof, reference is made to the accompanying drawings and its scope will be pointed out in the appended claims.

In the drawings:

FIG. 2 is a schematic showing of a portion of the depth selector embodying the invention in a deep depth selection position;

FIG. 3 is a schematic showing of a portion of the depth selector in a full release position; and FIG. 4 is a three-dimensional showing of the internal co-operation of the parts of a portion of the pin release mechanism.

Figure 1:
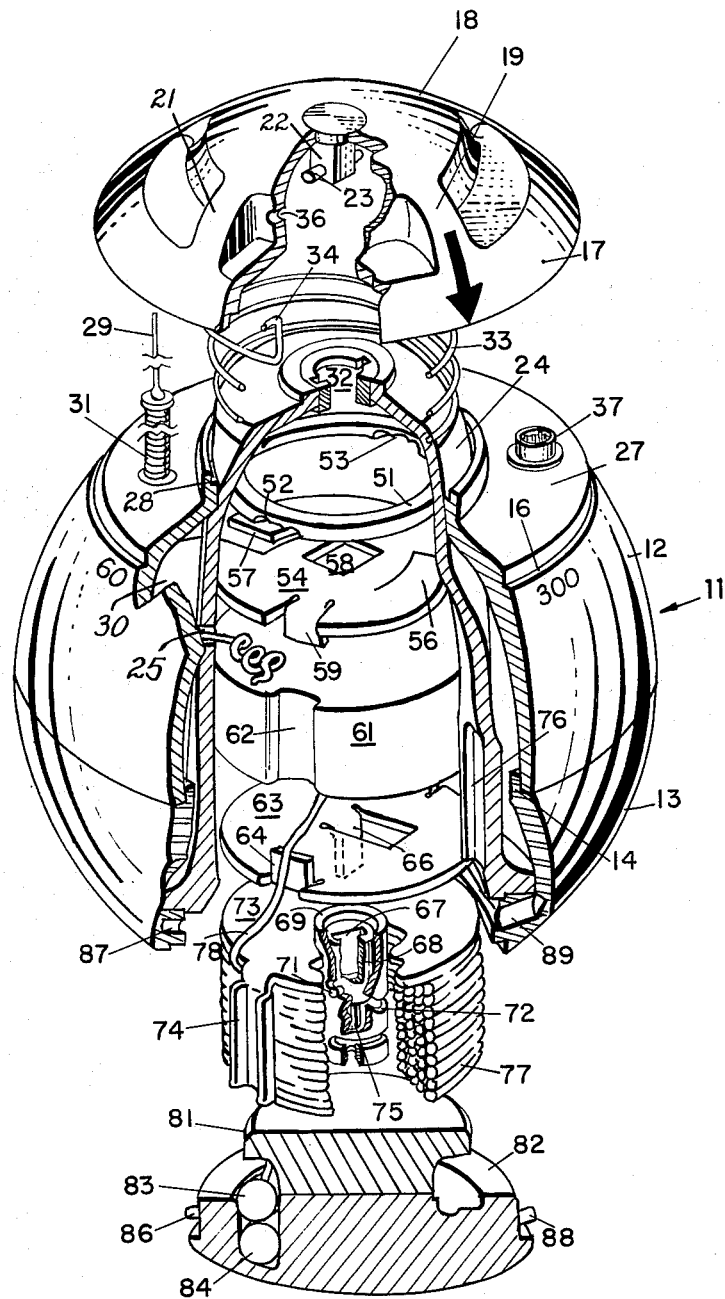
FIG. 1 is an exploded three-dimensional view of a spherical sonobuoy embodying the invention.

Referring now to FIG. 1, there is depicted a spherical sonobuoy 11 in an exploded view. This sonobuoy 11 has an upper shell 12 and a lower shell 13 which may be formed of high impact resistant plastic or other suitable material. The upper and lower shells 12 and 13 are pre-moulded and are fitted together at the stepped overlapping junction 14, the upper shell 12 being bonded by a suitable adhesive to the lower shell 13 at the stepped overlapping junction 14. At the upper portion of the upper shell 12 there is a peripheral groove 16 which surrounds the upper edge of the upper shell 12. Directly above is a stabilizer cap 17 which is shown in this figure removed from the spherical shaped buoy 11. When the entire device is assembled, the stabilizer cap 17 fits down upon the upper shell 12 and firmly abuts the peripheral groove 16, thereby forming a continuously curved surface with the upper shell 12, the entire buoy taking the shape of a ball. The stablizing cap 17 has a raised central portion 18 and integrally formed thereon stabilizing ribs 19 and 21. At the center of the raised central portion 18, there is affixed a downwardly projecting rectangular pin arrangement 22 which may be pressed into the flight stabilizer cap 17 and secured by an adhesive or by internal threads on the cap 18 (not shown).

There is a cylindrical pin 23 passing through the downwardly projecting pin 22, the function of which will be described more fully hereafter.

Located within the spherical buoy 11, there is a central cavity cup 24 which is also made up of a preformed plastic or other suitable material. This central cavity cup 24 is integrally bonded at the interface 26 located at the base of the lower shell 13. The upper shell 12 has an upper surface 27 and an opening through the center of the surface through which the central cavity cup 24 passes. At a point where the central cavity cup passes through the upper surface 27, there is a seal (not shown). This seal prevents the entrance of moisture into the internal component compartment 30 in which is housed the electronic gear which ultimately transmits information received from the buoy's suspended hydrophones which will be discussed more fully hereafter. There is also shown mounted in the upper surface 27 an antenna 29 which has an antenna erector spring 31 integrally connected thereto, the antenna 29 and antenna erector spring 31 function in a manner to be described hereinafter.

The central cavity cup 24 has at its upper surface a slotted opening 32, which opening is of a sufficient dimension and configuration to permit the entrance of downwardly projecting rectangular pin 22 and its cylindrical pin 23. Located between the flight stabilizer cap 17 and upper surface 27 of the upper shell 12 is an expandable torsion spring 33 having a bent end 34 which cooperates with opening 36 in cap 17 when assembled. The remaining end of the expandable torsion spring 33 is fitted securely to an opening in the upper shell 12 in a manner not shown.

The upper surface 27 of the shell 12 has a test port 37 which permits the electric testing of the components within the internal component compartment 30.

Internally of the central cavity cup 24 and in the upper region thereof, there is shown a detent cam ring 51 which is illustrated as separated from the top wall of the cavity cup but when assembled, this cam ring 51 is fixedly mounted at the upper end of the internal cavity cup 24.

On the lower surface of the detent cam ring 51 are a plurality of grooved cam surfaces 52 and 53, which grooved surfaces cooperate with a detent spring plate 54 located directly beneath the detent cam spring 51. This detent spring plate 54 has integrally formed thereon raised spring elements 56 and 57 which are to cooperate with the grooved cam surfaces 52 and 53 in a manner to be described more fully hereafter.

At the very center of the detent spring plate 54 is a rectangular opening 58 which permits when the entire device is assembled, the downwardly projecting rectangular pin 22 to fit with a mating relationship with an opening 58. At the periphery of the detent spring plate 59 there are a plurality of downwardly projecting tangs 59, one of which is shown. The downwardly projecting tang 59 cooperates with a mating indentation 62 of a salt water activated battery 61. Directly beneath the salt water activated battery 61 is a cam drive plate 63 which has at its periphery an upwardly projecting tang 64 which also cooperates with mating indentation 62 when the entire device is assembled.

At the center of the cam drive plate 63 is a male cam drive tab 66 which has been formed in this instance by the punching of the plate 63.

Located beneath the cam drive plate 63 and in central alignment therewith is a slotted opening 67 formed in a cable release cam follower 68 which is shown in this figure partially in section. It is to be understood that when the entire device is assembled, the male cam drive tab 66 will fit within the slotted opening 67.

Cooperating with the cable release cam follower 68 is a cylindrical slotted cam 69 surrounding the cam follower 68 which is in turn securely affixed to the suspension cable holder plate 73. The cable release cam follower 68 has at its base a pin 71 which passes outwardly from its surface and through a cam surface opening 72. Formed on the bottom of the cable release cam follower 68 is a male release pin 75. The functional cooperation of these interfitting pieces just related will be described more fully hereafter with reference to illustrations represented in FIGS. 2, 3, and 4.

The suspension cable holder plate 73 has at its periphery one or more locking grooved channels 74 which extend downwardly from the suspension cable holder plate 73. These locking grooved channels 74, of which one is shown, serve the dual function of providing means for support for the cable supply 77 which is wound from the center outwardly to the outer periphery as can be seen in this figure.

The locking grooved channel 74 functionally cooperates with female grooves 76 of the central cavity cup 24 to provide, when assembled, the needed stationary reaction to be transmited to the cylindrical slotted cam 69 at the center of the suspension cable plate 73. The grooved locking channels 74 also provide a convenient passageway for electrical wiring 78.

It is to be understood that the electronic gear (not shown) within the internal component compartment 30 is electrically connected in series through an opening 25 in the wall of the cavity cup 24, to the battery 61; thence, to the suspension cable supply 77, and finally to a weight 81 by hydrophones 83 and 84, schematically depicted in a nestled manner within the bottom release cap 82. There is a water seal in this opening 25 (not shown). The bottom release cap 82, when the entire device is assembled, fits securely in the opening provided at the base of the internal cavity cup 24. The bottom release cap 82 has a fixed hinge pin 86 which cooperates, when assembled, with hinge pin hole 87 in the bottom shell 13 to form with the upper and lower shells 12, 13 a ball shaped unit.

Diametrically opposite the fixed hinge pin 86 is a spring loaded sliding pin 88 which fits within pin hole 89 of the lower shell 13. The sliding pin 88 and the mechanism that causes its reciprocation downwardly into the bottom release cap 82 are not shown in the drawings and are not part of the invention being described herein.

Suffice it to say that when the entire sphere shaped buoy is assembled, the bottom release cap 82 is fitted securely at the mouth of the central cavity cup 24 and when the buoy strikes the water, this bottom release cap automatically falls away from the buoy permitting the weight 81 and related hydrophones 83 and 84 to pass into the depths of the ocean in a manner to be more fully described hereafter.

Reference is now made to FIG. 2 in which there is depicted a schematic representation of the mechanism utilized to control the amount of cable to be released from the sonobuoy. There is illustrated a cable release cam follower 68 in a downward position in which the release pin 75 is fitted in the female release pin opening 92. The cable supply 77 is shown in section with a portion of the cable leaving the cable supply 77 at a preselected suspension cable departing point 80, the cable supply 77 being wound from the inside out. There is provided at a point intermediate the ends of the cable supply 77 a loop knotted portion 79 through which passes the male release pin 75. When the cable release cam follower 68 is in a downwardly position, only that portion of the line between the weight 81 and the loop knotted portion 79 may pay out to a length determined by where the loop knotted portion 79 is tied in the cable. In this figure, the cable release cam follower 68 with its related pin 71 have been rotated to a point which has brought the cable release cam follower 68 to the bottom of its travel, the pin 71 having cooperated with a slot 72 of the cylindrically slotted cam 69 which has been shown schematically fixed at the reaction point 91. It will therefore be seen that any rotary motion transmitted to the cable release cam follower 68 will produce a reciprocating action on the cable release cam follower 68.

Reference is now made to FIG. 3 in which there is depicted another schematic representation of the operation of the release mechanism. The cable release cam follower 68 is in its raised position and the male release pin 75 is accordingly raised above the female release pin opening 92. This, as can be seen from the drawings, permits the knotted loop 79 of the suspension cable supply 77 to pass freely from the sonobuoy and in so doing, all of the line in the cable suspension supply 77 is permitted to pass out of the central cavity cup 24 into the depths of the ocean.

Referring now to FIG. 4, there is illustrated a three-dimensional cut-away section depicting the internal co-operation of the parts of the release mechanism described above. As can be seen, there is a slotted cylindrical cam 69 in which there is housed a cable release cam follower 68 which has in the upper surface thereof, a slotted opening 67 which when the device of FIG. 1 is assembled, receives the male cam drive tab 66. At the base of the cylindrical slotted cam 69, there is a knotted loop slotted opening 96 into which the cable knotted loop 79 may be inserted. On the bottom of this knotted loop slotted opening 96, there is provided a knot groove 97 which has been formed to permit the knotted portion of the cable loop 79 to reside preparatory to its ultimate passage from the release mechanism should the buoy be so set as to require that all of the cable supply 77 be released. The pin 71 is shown riding on the cam surface opening 72 at a point which corresponds to the cable release cam follower 68 being in its most raised position.

As is evident from this figure, any rotary movement of the cable release cam follower 68 will of necessity require that the cable cam follower 68 move downwardly along the predetermined path made by the slotted cam opening 72 and the male release pin 75 will also move downwardly into the release pin opening 92.

Referring now to the overall operation of the depth selection mechanism as shown in FIG. 1 and in order to better understand the operation of the many detailed elements present in this device, FIG. 1 has been shown with many of the parts separated. In order to gain a full appreciation of the functional cooperation of the various parts, one must view all of the components shown in FIG. 1 in an assembled condition. When FIG. 1 is totally assembled, the downwardly projecting rectangular pin 22 of the flight stabilizer cap 17 passes through the opening 32 in the central cavity cup 24 and then into the rectangular opening 58 of the detent spring plate 54. It is to be understood that this detent spring plate 54, when assembled, is pressed upwardly against the detent cam ring 51 which is to be firmly fixed at the top of the central cavity cup 24. The integrally formed spring elements 56 and 57 in turn ride along the lower surface of the detent cam ring 51. If the stabilizer cap 17 is given a rotary movement, this rotary movement is translated via the downwardly projecting rectangular pin 22 to the detent spring plate 54 which causes the detent spring plate 54 to rotate and the spring elements 56 and 57 of the detent spring plate 54 ride into and out of the grooved cam surfaces 52 and 53 of the detent cam ring 51. This detent spring plate 54, as seen in FIG. 1, may be rotated 180 degrees to selectively engage spring element 57, with, for example, grooved cam surface 52 or in the alternative, spring element 57 may be counter-rotated to come in contact with the grooved cam surface 53. Because this detent spring plate 54 is pressed up against the ring 51 once the flight stabilizer cap 17 has been rotated to one of the two positions above, the position is maintained due to the cooperation of the spring elements 56 and 57 with respective grooved cam faces 52 and 53. Rotary movement as described above of the flight stabilizer cap 17 is transmitted to the salt water activated battery 61 via the downwardly projected tang 59 which engages the mating indentation 62 in the battery 61. This rotary motion is also transmitted to cam drive plate 63 by way of the upwardly projecting tang 64 and its physical coaction with the mating indentation 62 of the battery 61. As has been noted, the entire cam drive plate 63 is caused to rotate by the above recited coaction of the elements that interconnect the cam drive plate 63 with the stabilizer cap 17. At the center of the cam drive plate 63, there protrudes, in a downward direction, the male cam drive tab 66 which fits in a sliding manner into the slotted opening 67 of the cable release cam follower 68. The rotary motion transmitted to the male cam drive tab 66 is transmitted directly to the cable release cam follower 68 and since the cable release cam follower 68 is constrained to move within the confines of the slotted opening 72 of the cylindrically slotted cam 69, the cable release cam follower 68 will move from a raised position to a lowered position depending on whether the person turning the stabilizer cap 17 desires a portion of the entire cable supply 77 a pass from the buoy or on the other hand, desires all of the cable to be released in order that the hydrophones descend to a depth determined by the total length of the cable supply 77. It is therefore seen that the elementary twist of the stabilizer cap 17 externally of the sphere shaped buoy 11 allows the party using this buoy to select one of two depths quickly and efficiently.

While not discussed directly above, the expandable torsion spring 33 with its bent end 34 provides a dual function of spring loading the in-flight stabilizer cap 17 to provide a rotary motion to the cap 17 to return pin 23 into alignment with the opening 32 followed by expansion of spring 33 to eject the cap 17 upon water impact in a manner to be described hereafter.

The above description has been directed to an explanation of the depth selection setting mechanisms. In use, the sonobuoy which is conveniently launched from an aircraft above the water in some predetermined pattern, strikes the water surface and the bottom release cap 82 releases from the bottom shell 13 of the buoy and permits the descent of the weight 81 and related hydrophones 83 and 84.

While not clearly shown in the schematic drawing present in FIG. 1, there is stored within the central cavity cup 24, an electrical wire 78 of a sufficient length to permit the hydrophones 83 and 84 and the weight 81 to be suspended a small distance apart at the end of the supply cable. In a like manner, there is stored within the central cavity cup 24 a sufficient supply of electrical wire 78 to permit the battery 61 to pass into the ocean and be suspended beneath the buoy 11. Upon water impact, as has been noted, the weight 81 and the hydrophones 83 and 84 which are to be lowered into the ocean at some predetermined depth, are followed by the passage into the ocean of the battery 61 which has received both a tugging action due to the weight 81 and a spring force downwardly by the spring elements 56 and 57.

While there has been hereinbefore described what are at present considered preferred embodiments of the invention, it will be apparent that many and various changes and modifications may be made with respect to the embodiment illustrated, without departing from the spirit of the invention. It will be understood that all changes and modifications as fall fairly within the scope of the present invention, as defined in the appended claims, are to be considered as part of the present invention.

What is claimed is:

1. An air-launched sonobuoy comprised of a floatable housing having mounted thereon a stabilizing means movable between first and second settings,
   A. said stabilizing means mechanically linked to a detent mechanism mounted within said housing,
   B. said movable stabilizing means cooperating with said detent mechanism to hold said stabilizer in one of said settings,
   C. a suspension cable supply mounted in said floatable housing and having an end of said cable connected to said floatable housing and said cable's remaining end connected to a unit to be suspended at different depths,
   D. suspension cable release means drivingly connected to said stabilizer and movable between two positions to allow when in a first position corresponding to said first setting the release of a portion of said suspension cable and said connected unit to a predetermined depth.

2. The combination set forth in claim 1 wherein said suspension cable's supply release means is comprised of a reciprocating cam follower mounted within a cylindrical slotted cam,
   A. said cam follower having a portion thereof cooperating with said cylindrical cam to move between said first and second positions,
   B. said cam follower having means thereon cooperating with said cable supply to allow when in said first position the release of a predetermined length of cable, and when in said second position the release of the entire supply of said cable.

3. A depth selection device for underwater suspension of a component at different depths from a floatable support housing comprised of:
   A. a depth selection control means located externally of said support housing for manual manipulation and movable between a first and second setting,
   B. said floatable support housing having a detent mechanism mounted therein,
   C. said depth selection control means cooperating with said detent mechanism to hold said control means in one of said settings,
   D. a suspension cable supply mounted in said floatable support housing and having an end of said cable connected to said floatable support housing and the remaining end connected to a unit to be suspended at said different depths, and E. suspension cable supply release means movable between two positions to allow when in a first position corresponding to said first setting the release of a portion of said suspension cable and said connected unit to a predetermined depth.

4. A depth selection device for underwater suspension of a component at different depths from a floatable support housing comprised of:

A. a depth selection control means located externally of said support housing for manual manipulation and movable between a first and second setting, B. a suspension cable supply mounted in said floatable support housing having an end of said cable connected to said floatable support housing and the remaining end connected to a unit to be suspended at said different depths, C. a suspension cable supply release means having a driving connection to said depth selection control means and having a reciprocating cam follower mounted within a cylindrical slotted cam, D. said cam follower having a portion thereof cooperating with said cylindrical cam to move between a first and second position corresponding to said first and said second settings, and E. said cam follower having means thereon cooperating with said cable supply to allow when in said first position the release of a predetermined length of cable, and when in said second position, the release of the entire supply of said cable.

5. The combination set forth in claim 4 wherein there is a detent means to hold said depth selection controlled means at said first and said second settings when said depth selection control means has been moved to said settings.

6. The combination set forth in claim 5 wherein said floatable support housing has a spherical shape.

7. The combination set forth in claim 6 wherein said depth selection control means has a ribbed configuration to thereby provide said spherical shape housing with a means to stabilize said housing when said housing is submerged in water while simultaneously affording a structure to allow said manual manipulation.

8. The combination set forth in claim 4 wherein said depth selection control means is spring biased away from said floatable support housing.

9. The combination set forth in claim 4 wherein said release means driving connection has a salt water actuated battery as part of said driving connection.

10. The combination set forth in claim 4 wherein said unit to be suspended at different depths is a hydrophone.

11. An air-launched sonobuoy for use in the detection of underwater objects comprised of a floatable sphere shaped support housing, A. said sonobuoy having a depth selection mechanism to control the underwater suspension of a component at different depths from said floatable sphere shaped supporting housing, B. a depth selection control means mounted on said floatable sphere shaped support housing and having a ribbed configuration to thereby provide said floatable sphere shaped support housing with a means to directionally stabilize said floatable sphere shaped support housing when said sonobuoy enters the water, C. said ribbed configuration thereby providing a structure for the manual manipulation of said depth selection control means between a first and a second setting, D. a suspension cable supply mounted in said support housing and having an end of said cable connected to said floatable support housing, the remaining end connected to a unit to be suspended at said different depths, and E. said depth selection mechanism having a suspension cable release means having a driving connection to said depth selection control means which is movable between two positions to allow when in a first position corresponding to said first setting the release of a portion of said suspension cable and said connected unit to a predetermined depth.

12. The combination set forth in claim 11 wherein said air-launched sonobuoy releases its depth selection mechanism after water impact.

13. The combination set forth in claim 12 wherein said depth selection control means is spring biased away from said floatable sphere shape housing.

14. The combination set forth in claim 12 wherein said driving connection is separable upon water impact to thereby allow said depth selection mechanism to pass into said water and said depth selection control means because of said spring bias to be ejected from said floatable sphere shaped housing.

15. The combination set forth in claim 11 wherein said suspension cable release means driving connection has a battery as part of said driving connection.

16. The combination set forth in claim 11 wherein said unit to be suspended at different depths is comprised of a plurality of hydrophones.

17. The combination set forth in claim 11 wherein said depth selection control means is mechanically linked to a detent mechanism to hold said depth selection control means in one of said settings depending the depth that has been selected.

18. The combination set forth in claim 11 wherein said suspension cable release means has a reciprocating cam follower in a driving connection to said depth selection control means, A. said cam follower being mounted for reciprocation within a cylindrically slotted cam follower and having a portion thereof cooperating with said cylindrical cam to move between said first and said second positions.

19. The combination set forth in claim 18 wherein said cam follower has means thereon cooperating with said cable supply to allow when in said first position the release of a predetermined length of cable, and when in said second position, the release of the entire suspension cable supply.

No references cited.

CHESTER L. JUSTUS, *Primary Examiner.*

R. A. FARLEY, *Assistant Examiner.*